(12) United States Patent
Tateishi et al.

(10) Patent No.: US 6,912,791 B2
(45) Date of Patent: Jul. 5, 2005

(54) ROTATION ANGLE DETECTOR

(75) Inventors: Ichiro Tateishi, Fukui (JP); Yoshiyuki Nakade, Fukui (JP); Masahide Onishi, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/726,672

(22) Filed: Dec. 4, 2003

(65) Prior Publication Data

US 2004/0139619 A1 Jul. 22, 2004

(30) Foreign Application Priority Data

Dec. 11, 2002 (JP) ......................................... 2002-359059

(51) Int. Cl.[7] ................................................ G01B 3/56
(52) U.S. Cl. ........................................ 33/1 PT; 33/534
(58) Field of Search ................................. 33/1 PT, 1 N, 33/534

(56) References Cited

U.S. PATENT DOCUMENTS 6,293,022 B1 * 9/2001 Chino et al. ............. 33/203.18
6,530,715 B1 * 3/2003 Kraft et al. ................. 403/296
6,642,508 B2 * 11/2003 Setbacken et al. ...... 250/231.13

FOREIGN PATENT DOCUMENTS

JP 2002-206910 7/2002

* cited by examiner

*Primary Examiner*—Christopher W. Fulton
*Assistant Examiner*—Tania Courson
(74) *Attorney, Agent, or Firm*—Wenderoth, Lind & Ponack, L.L.P.

(57) ABSTRACT

To provide a rotation angle detector with high detecting accuracy for use in association with a steering wheel on a vehicle and the like, a rotation angle detector is constructed by providing a recess surrounding a shaft portion in a top face of a detecting member, and extending a shaft support, formed on an upper cover, into the recess.

12 Claims, 3 Drawing Sheets

ROTATION ANGLE DETECTOR

FIELD OF THE INVENTION

The present invention relates to a rotation angle detector for use in detecting rotary angle of a steering wheel on a vehicle and the like.

BACKGROUND OF THE INVENTION

With progress of higher-performance vehicles made in recent years, there have been proposed various rotation angle detectors (hereinafter called "RAD") for detecting the rotary angle of a steering wheel (hereinafter called "SWH"). An example of such RAD is disclosed, for example, in Japanese Patent Non-examined Publication No. 2002-206910.

A conventional art RAD will be described with reference to FIG. 5.

On the circumference of rotating member 1, there is formed spur gear portion 1A. Rotating member 1 has engagement portion 1B to engage the shaft of SWH (not shown) inserted in the center thereof. Insulative resin-made detecting member 2 has a substantially planar top face. Spur gear portion 2A provided on the circumference of detecting member 2 is in a meshing arrangement with spur gear portion 1A on rotating member 1. Detecting member 2 has a cylindrical columnar protrusion 2B formed in the center of its underside. Protrusion 2B has magnet 3 mounted at its end by performing such an operation as insert molding.

Circular columnar shaft portion 4, made of a metal, is fixed by insert molding or the like to the center, i.e., the rotation axis, of detecting member 2, as projected upward.

Axes of shaft portion 4 and magnet 3 are each arranged substantially in alignment with the axis of detecting member 2.

There are provided a plurality of wiring patterns (not shown) on both sides of wiring board 5 disposed substantially parallel to the underside of detecting member 2. Further, magnetic sensor element 6 is mounted on the face opposite to detecting member 2. Magnet 3 and magnetic sensor element 6 arranged opposite to each other constitute sensor means 7.

Further, there is provided wiring board 8 connected with wiring board 5 via lead wire 9. On wiring board 8, there is formed control device 10 constructed of electronic parts including a microcomputer. Control means 10 is connected to an electronic circuit (not shown) on the vehicle body by way of a connector (not shown).

Further, cylindrical supporting member 11, made of an insulative resin, is fixed on to the top face of wiring board 5. Cylindrical supporting member 11, while surrounding protrusion 2B, supports the underside of detecting member 2 for rotation. Upper cover 12, made of an insulative resin, has shaft support 12A protruded downward from its underside, shaft support 12A having a diameter slightly larger than the diameter of shaft portion 4 of detecting member 2. Shaft portion 4 of detecting member 2 is inserted into shaft support 12A to be supported thereby for rotation.

Rotating member 1, wiring board 5, wiring board 8, and the like are covered by insulative resin-made case 13, insulative resin-made side cover 14, and upper cover 12, so that these are kept in place to configure RAD.

As SWH is turned in the above described configuration, rotary member 1 is rotated accordingly. Following this rotation, detecting member 2 with its circumferential spur gear portion 2A in mesh with circumferential spur gear portion 1A of rotating member 1 also rotates taking, as the center of rotation, shaft portion 4, which is supported by shaft support 12A protruded from upper cover 12. As detecting member 2 rotates, the magnetic field around magnet 3 mounted on the center of detecting member 2 changes. Then, the change in the magnetic field is detected by magnetic sensor element 6, and a detection signal with a substantially triangular waveform is output to control means 10. Thus, it is arranged such that control means 10 detects the rotation angle of rotating member 1 on the basis of the number of waveforms and a voltage value of the detection signal from magnetic sensor element 6. An angle of rotation of SWH can thus be detected. However, when such conventional RAD is mounted on a vehicle, there are also placed other equipment or parts on top of RAD. Accordingly, the height from the top face of detecting member 2 up to the top face of upper cover 12 is limited and, hence, length L1 of shaft support 12A formed between the top face of upper cover 12 and the top face of detecting member 2 becomes short. As a result, shaft portion 4 supported within shaft support 12A tends to show play or looseness during rotation.

Such play or looseness causes undesirable rotational deflections to magnet 3 provided at the bottom end of detecting member 2. Thus, conventional RAD is confronted with a problem that errors are liable to be produced in a detected angle of rotation.

The present invention is addressed to such a problem in the conventional art, and it is an object of the invention to provide RAD with high detection accuracy.

SUMMARY OF THE INVENTION

The present invention provides a rotation angle detector including a rotating member, a detecting member rotating in conjunction with rotation of the rotating member, a cover having a shaft support formed thereon for rotatably supporting a shaft portion of the detecting member, and sensing device for detecting rotation of the detecting member, in which the detecting member is provided with a recess surrounding the shaft portion, and the shaft support formed on the cover is extended into the recess.

DETAILED DESCRIPTION OF THE INVENTION

Figure 1:
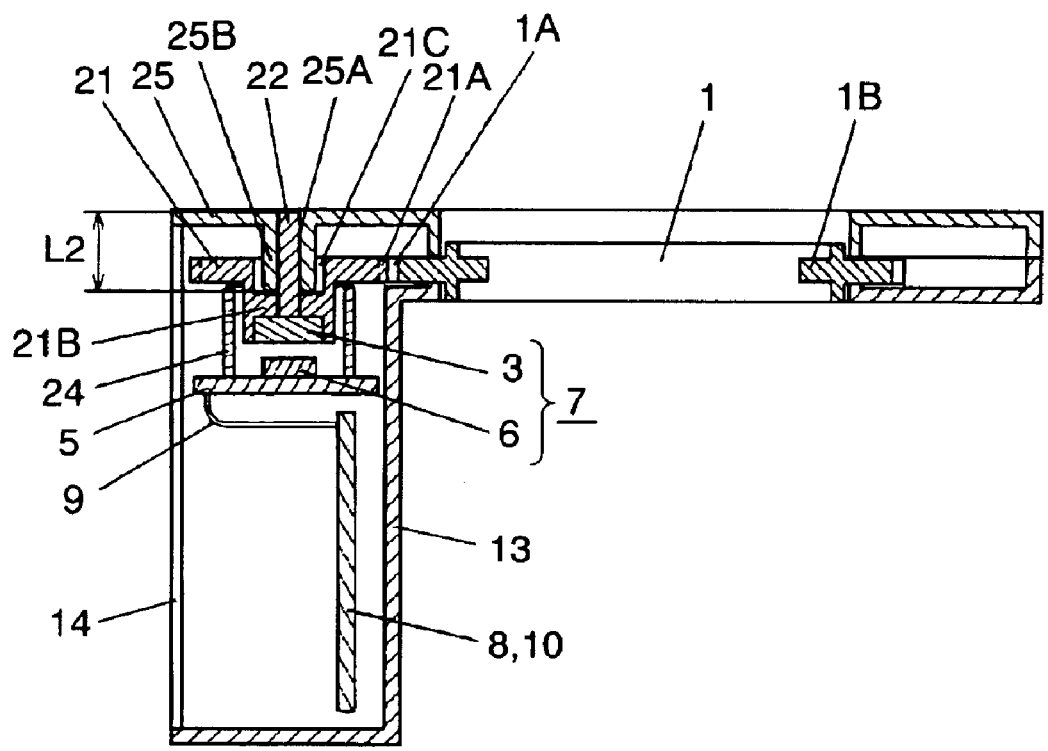
FIG. 1 is a sectional view of RAD according to an exemplary embodiment of the present invention.
Figure 2:
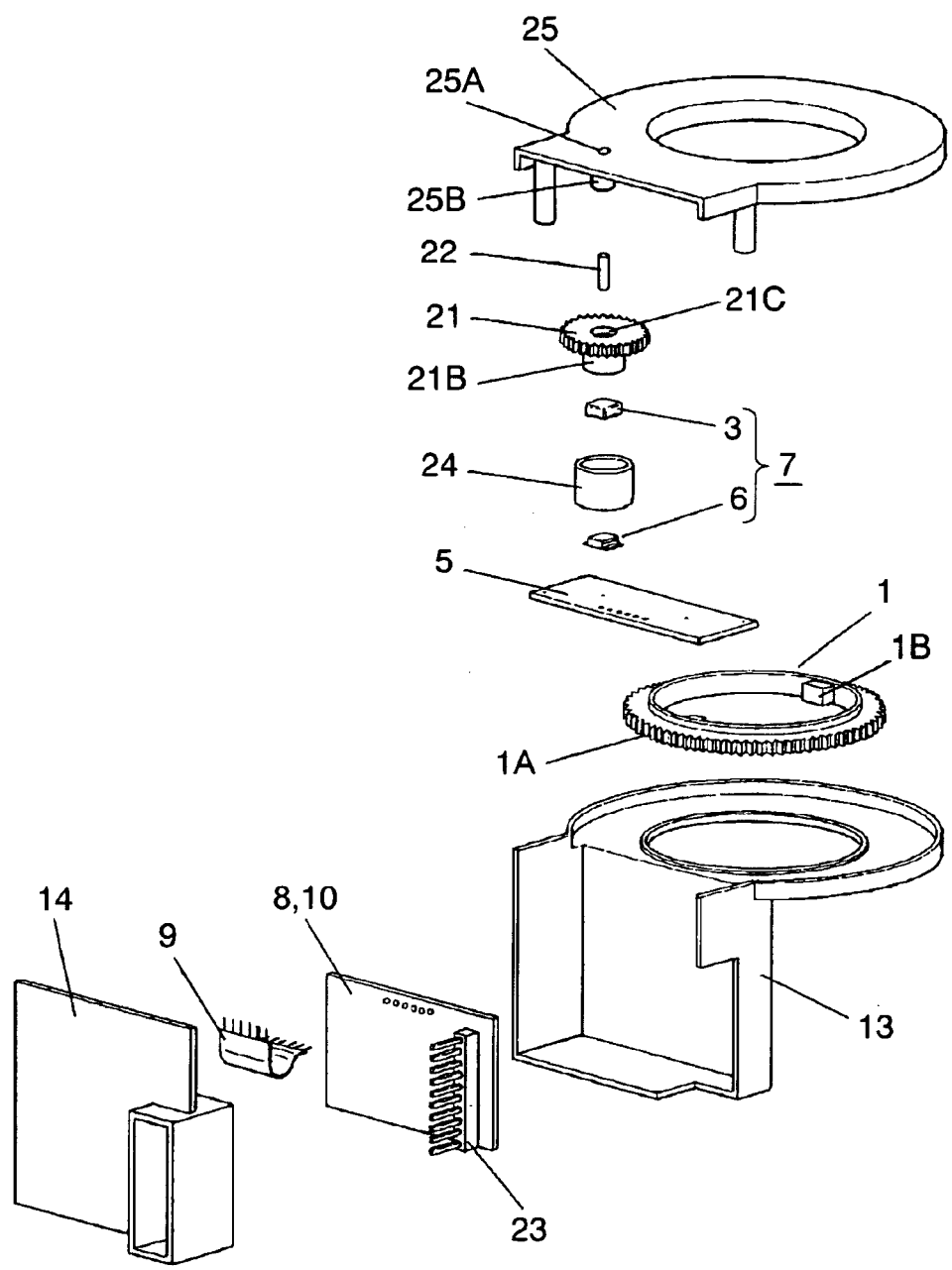
FIG. 2 is an exploded perspective view of RAD according to the embodiment of the invention.

An exemplary embodiment of the present invention will be described with reference to the accompanying drawings. Component parts like those described in the section of BACKGROUND OF THE INVENTION will hereinafter be denoted by like reference numerals and detailed description of the same will be simplified. Further, the drawings are schematic ones and not showing each position exactly.

(Exemplary Embodiment)

Rotary member 1 is made of an insulative resin such as polyoxymethylene (POM) and polyphenylene-sulfide (PPS).

On a circumference of rotating member 1, there is formed spur gear portion 1A and, in a center portion thereof, there is provided engagement portion 1B to engage a shaft of SWH (not shown) inserted therein.

Insulative resin-made detecting member 21 is provided, on its circumference, with spur gear portion 21A arranged in a meshing relationship with spur gear portion 1A on rotating member 1. Detecting member 21 is further provided with a cylindrical columnar protrusion 21B in the center portion of its underside. At the end of protrusion 21B, there is mounted magnet 3 by being insert molded therein.

As magnet 3, any type of permanent magnet can be used. For example, a ferrite magnet, samarium magnet, and neodymium magnet can be preferably used. Circular-columnar shaft portion 22, made of a metal, is fixed by being insert molded or the like to the center position, i.e., the rotation axis of detecting member 21, so as to projected upwardly. Further, in a top face of detecting member 21, there is provided recess 21C surrounding a periphery of shaft portion 22. Axes of shaft portion 22 and magnet 3 are each arranged substantially in alignment with the axis of detecting member 21. On a face opposite to detecting member 21, there is disposed wiring board 5 with magnetic sensor element 6 mounted thereon. As magnetic sensor element 6, such a magneto resistive element as InSb is preferably used.

Magnet 3 and magnetic sensor element 6 arranged opposite to each other constitute sensor means 7. Wiring board 8 having control means 10 thereon is connected to wiring board 5 via lead wire 9. Control means 10 is connected to an electronic circuit (not shown) on the vehicle body through connector 23. Further, cylindrical supporting member 24 made of an insulative resin such as POM and polybutylene terephthalate (PBT) is fixed onto the top face of wiring board 5. This cylindrical supporting member 24 is arranged to surround protrusion 21B and supports the underside of detecting member 21 for rotation. Further, upper cover 25, made of an insulative resin such as POM and PBT, is provided with shaft support 25B protruding downward from its underside and having a through hole 25A slightly larger in diameter than shaft portion 22 of detecting member 21. This shaft support 25B is arranged to extend into recess 21C provided in the top face of detecting member 21 until its end abuts on the bottom face of recess 21C. Shaft portion 22 is inserted into shaft support 25B to be supported thereby for rotation.

Rotary member 1, wiring board 5, wiring board 8, and the like are covered by insulative resin made case 13, insulative-resin-made side cover 14, and upper cover 12, so that these are kept in place to configure RAD.

As SWH is turned in the above described configuration, rotatary member 1 is rotated accordingly. Following this rotation, detecting member 21, with its circumferential spur gear portion 21A in mesh with circumferential spur gear portion 1A of rotating member 1, also rotates taking shaft portion 22 as a center of rotation.

Figure 5:
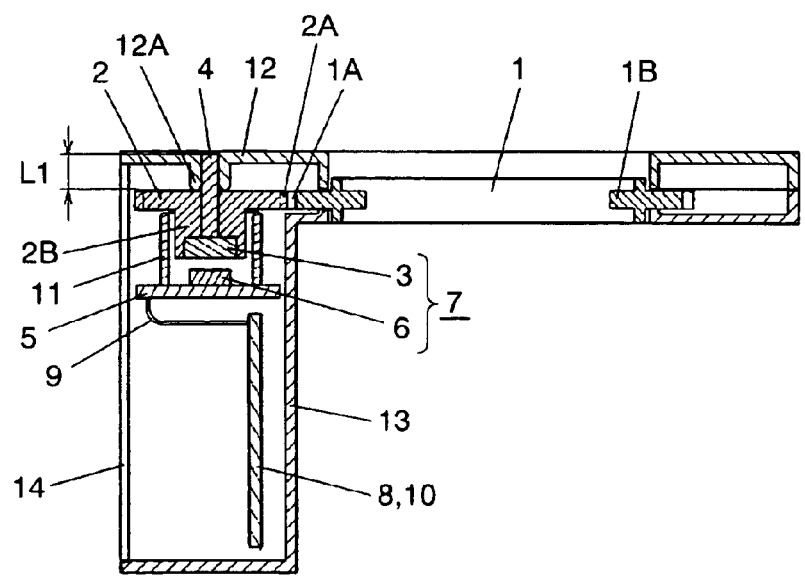
FIG. 5 is a sectional view of conventional RAD.

At this time, length L2 of shaft portion 22 supported by shaft support 25B is made greater than length L1 of that in the conventional art example shown in FIG. 5 by the depth dimension of recess 21C into which shaft support 25B is extended. Further, since the end of shaft support 25B abuts a bottom face defining recess 21C, detecting member 21 can be rotated with reduced play or undesirable rotational deflections.

Figure 3:
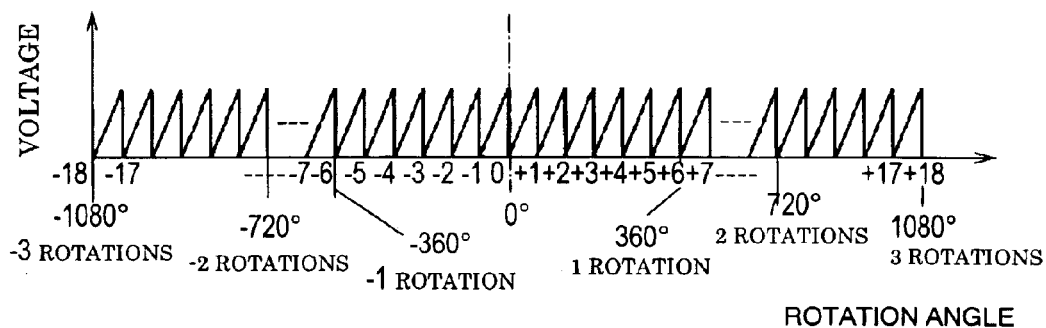
FIG. 3 is a voltage waveform diagram in RAD according to the embodiment of the invention.

As detecting member 21 is rotated, magnet 3 mounted in the center thereof is also rotated. Changes in the magnetic field produced at this time are detected by magnetic sensor element 6. Then, a detection signal cycling with a substantially triangular waveform gradually increasing, or decreasing, as shown in FIG. 3 is output to control means 10. Where angles of rotation are indicated by negative numerals, the angles are that measured in the direction opposite to the direction in which the angles of rotation are indicated, are indicated by positive values.

Figure 4:
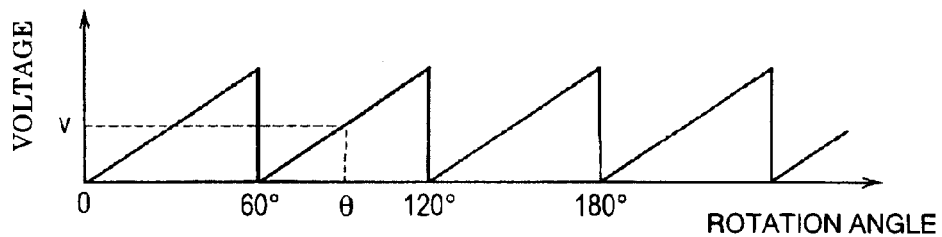
FIG. 4 is a method of detecting rotation angle in RAD according to the embodiment of the invention.

Suppose now that the number of teeth of detecting member 21 is set to be, for example, one third of the number of teeth of rotating member 1 and magnetic sensor element 6 is adapted to detect one change in the magnetic field intensity every rotation of 180° of detecting member 21. Then, detecting member 21 makes three rotations during one rotation of rotating member 1, while, during one rotation of detecting member 21, magnetic sensor element 6 detects two changes in the magnetic field intensity. Hence, six voltage waveforms in a substantially triangular shape are successively detected as the detection signal. More particularly, for a 60° rotation of rotating member 1, one substantially-triangular voltage waveform is output from magnetic sensor element 6 and supplied to control means 10 as the detection signal. Then, control means 10, first, counts the number of waveforms of the detection signal to thereby detect approximate angle of rotation of rotating member 1. Then, the control device 10 detects the accurate angle of rotation of rotatary member 1 from the voltage value. For example, in the case where the angle of rotation is θ as shown in the voltage waveform diagram of FIG. 4, then, first, the ordinal number of the waveforms counted from the base point at 0° is two, and hence it is detected that the angle of rotation is between 60° and 120°. Then, RAD is adapted to detect that the accurate angle of rotation is 90°, for example, based on voltage value v.

In the present embodiment, as described above, while recess 21C is provided in the upper face of detecting member 21 to surround shaft portion 22, shaft support 25B formed on upper cover 25 is extended into recess 21C. Thus, shaft portion 22 of detecting member 21 can be supported by shaft support 25B having an elongated span or dimension in the axial direction. As a result, play or undesirable deflections of shaft portion 22 occurring when it rotates within through hole 25A can be reduced and undesired rotational deflections of magnet 3 provided at the end of detecting member 21 can also be reduced. Thus, it becomes possible to have a signal with small error detected by sensing device 7 and to obtain RAD having high detection accuracy.

Further, since shaft portion 22 is supported by shaft support 25B along its elongated axial span or dimension, the load applied to the inner periphery of through hole 25A during rotation can be distributed.

Consequently, wear and tear on the inner periphery of through hole 25A due to rotation of shaft portion 22 can be reduced and hence life of RAD can be extended.

As described above, according to the present invention, it becomes possible to provide RAD having undesirable rotational deflections of detecting member 21 reduced and capable of making highly accurate detection.

What is claimed is:

1. A rotation angle detector comprising:
   a rotary member;
   a detecting member that is to rotate in conjunction with rotation of said rotary member;
   a cover having a shaft support for supporting a shaft portion of said detecting member for rotation; and
   a sensing device for detecting rotation of said detecting member,
   wherein said detecting member includes a recess surrounding said shaft portion, and said shaft support is extended into said recess.

2. The rotation angle detector according to claim 1, wherein said rotary member is to rotate in cooperation with a steering wheel.

3. The rotation angle detector according to claim 2, wherein said sensing device includes a magnet and magnetic sensor element.

4. The rotation angle detector according to claim 3, wherein said magnetic sensor element comprises a magneto resistive element.

5. The rotation angle detector according to claim 1, wherein said sensing device includes a magnet and magnetic sensor element.

6. The rotation angle detector according to claim 5, wherein said magnetic sensor element comprises a magneto resistive element.

7. The rotation angle detector according to claim 1, wherein an end of said shaft support abuts a bottom face defining said recess.

8. The rotation angle detector according to claim 7, wherein said rotary member is to rotate in cooperation with a steering wheel.

9. The rotation angle detector according to claim 8, wherein said sensing device includes a magnet and a magnetic sensor element.

10. The rotation angle detector according to claim 9, wherein said magnetic sensor element comprises a magneto resistive element.

11. The rotation angle detector according to claim 7, wherein said sensing device includes a magnet and magnetic sensor element.

12. The rotation angle detector according to claim 11, wherein said magnetic sensor element comprises a magneto resistive element.

* * * * *